May 2, 1961 HANS-HELLMUT GRUN ET AL 2,982,765
PROCESS FOR CONTINUOUSLY ADMIXING ALKALI
CELLULOSE WITH ETHERIFYING AGENTS
Filed June 23, 1958
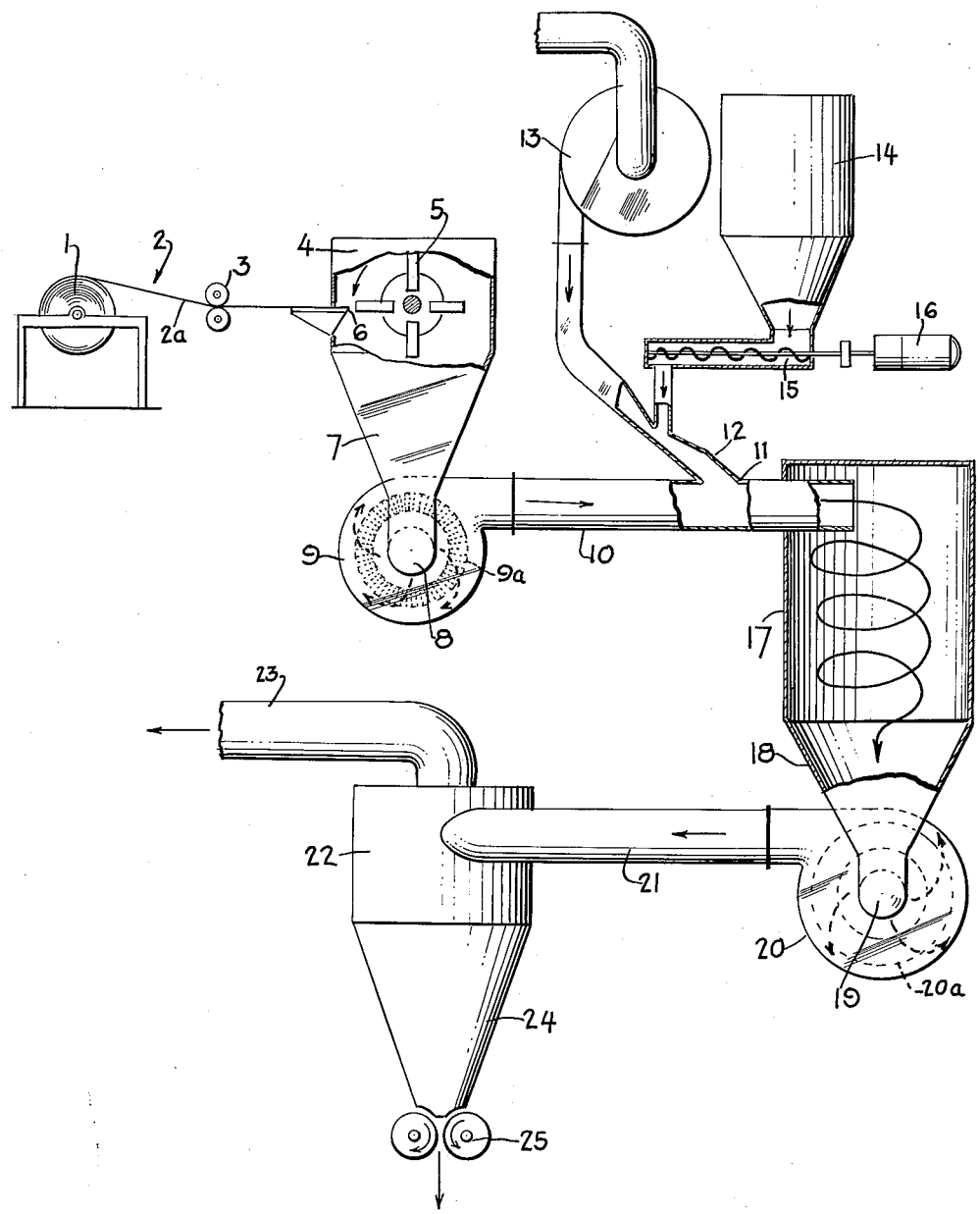
INVENTORS
Hans Hellmut Grun
BY Joachim Schmidt
Hammond
ATTORNEYS United States Patent Office 2,982,765
Patented May 2, 1961

2,982,765
PROCESS FOR CONTINUOUSLY ADMIXING ALKALI CELLULOSE WITH ETHERIFYING AGENTS

Hans-Hellmut Grun, Dusseldorf-Holthausen, and Joachim Schmidt, Dusseldorf-Benrath, Germany, assignors to Henkel & Cie. G.m.b.H., Dusseldorf-Holthausen, Germany, a corporation of Germany Filed June 23, 1958, Ser. No. 743,954
Claims priority, application Germany June 25, 1957
7 Claims. (Cl. 260—231)

This invention relates to a process for continuously admixing alkali cellulose with etherifying agents, in which the shredded alkali cellulose and a finely divided etherifying agent is suspended in a moving gas stream in which the individual particles of the mixture continuously change their position relative to each other to thereby bring about better mixing and the mixture is then subjected to shearing forces in a comminuting device.

One of the objects of the invention is to provide a continuous and more rapid process of mixing shredded alkali cellulose with etherifying agents.

Other objects and advantages of the invention will become apparent as this description proceeds.

The transformation of cellulose into cellulose ethers generally proceeds through three process steps: (a) production of the alkali cellulose, (b) admixing of the alkali cellulose with the etherifying agent, and (c) performance of the etherifying reaction. These process steps, primarily the admixing of the alkali cellulose with the etherifying agent, have heretofore been carried out mostly in discontinuous fashion by admixing the comminuted alkali cellulose with the etherifying agent in known mixing devices and then introducing the mixture into the reaction vessel. The admixing generally takes place in apparatus in which the mixture consisting of alkali cellulose and etherifying agent is agitated by scoops, arms, bent shafts, etc., such as illustrated, for example, in U.S. Patent No. 2,469,764.

These processes are burdened with the known disadvantages of discontinuous operation: in order to achieve large throughputs, relatively large vessels are needed in which the starting material must, however, be worked for relatively long periods to achieve a good mixing effect. Under these conditions a continuous contact of the alkali cellulose with the air can hardly be avoided in spite of all precautions to the contrary; the cellulose molecule is more or less degraded and products are obtained, the degree of polymerization of which may vary considerably. Added thereto are the difficulties which occur when solid hygroscopic or very reactive etherifying agents are used. These materials give rise to lump formation if the mixing time is too long and make it more difficult to work up the mass.

These difficulties are avoided if the entire process according to the invention described herein, is carried out in continuous fashion by producing a stream of gas in which shredded alkali cellulose and finely divided etherifying agent are fluidized, then agitating the mixture of shredded alkali cellulose and etherifying agent which is present in the form of a loose mass in such a way that the individual particles of the mixture continuously change their position relative to each other, and finally subjecting this mixture to shearing forces in a comminuting device, the comminuting organs of which are in relative motion to each other.

It is a particular characteristic of the process according to this invention that it takes place within very short periods of time. The residence period of the alkali cellulose in the apparatus in which the stream of gas with the shredded alkali cellulose distributed therein is produced, hereinafter referred to as the shredder for sake of simplicity, is about 0.02 to 2 seconds, preferably 0.1 to 1 second. The period during which the mixture of alkali cellulose and etherifying agent is agitated in the gas stream in the subsequent preliminary mixing step is, in contrast thereto, substantially longer; it may be 10 to 120 seconds, preferably 30 to 60 seconds. The working of the pre-mixed material under the influence of shearing forces again takes place within very short periods of time which are approximately equal to the residence period in the shredder. The entire process can therefore proceed within 20 to 200 seconds.

The production of the stream of gas with the shredded alkali cellulose particles finely divided therein proceeds in general in apparatus wherein the alkali cellulose is subjected to the influence of the shearing forces. These shearing forces are produced by relative motion of two comminuting organs. Such comminuting organs are, for example, two toothed grinding discs at least one of which rotates at high velocity. The other grinding disc may be at rest or may rotate in the same or opposite direction. Merely a relative motion between the two discs must exist, whereby the comminuting action is effected. For the same purpose other apparatus may, however, also be used, for example, rotating cross-beater or hammer-mills, wherein the rotating comminuting organs are situated within a stationary screening basket. In all of these devices a stream of gas is produced by the rotation of the comminuting organs, which projects the shredded alkali cellulose out of the exhaust nozzle of the comminuting device or shredder.

Under the effect of centrifugal force the alkali cellulose introduced into the apparatus is forced through between the grinding discs, whereby it is shredded into fine fibers. If the alkali cellulose is introduced into the shredder in a uniform stream with respect to composition and weight per unit time, this stream produces a substantially uniform stream of air which is laden with particles of shredded alkali cellulose. It is recommended to subject the alkali cellulose, which after dipping and pressing, is still primarily in the form of the original cellulose leaflets, to a preliminary comminuting treatment to such a degree that it can be introduced into the feed opening of the shredder in a continuous stream. Small variations in the feed rate of the alkali cellulose are compensated by the shredder.

The etherifying agent with which the alkali cellulose is to be reacted may be introduced into the shredder in finely divided form, preferably as an atomized or aerosol liquid or as an atomized solid substance. The finely divided etherifying agent may in this way pass through the comminuting organs together with the cellulose, however, it has been found to be particularly advantageous not to add the etherifying agent until the stream of finely divided alkali cellulose fluidized in air has been formed by the shredder. For this purpose, for example, a superatmospheric pressure is created with the aid of a fan or blower; the superatmospheric pressure serves to blow the etherifying agent into the stream of finely divided alkali cellulose gas stream flowing from the exhaust nozzle of the shredder, for example, in tangential fashion.

However, a jet nozzle may also be mounted in the stream after the shredder, through which the etherifying agent may be sucked or forced into the gas stream laden with the alkali cellulose particles.

The etherifying agent may be employed in solid or liquid state. Solid etherifying agents include, for example, halogenated fatty acids, especially chloracetic acid, haloalkyl sulfonic acids, especially chloroethane-sulfonic acid, and their salts, etc. Liquid etherifying agents may, however, also be used, for example, solutions of the above-mentioned solid etherifying agents. The solvent is preferably water. Suitable liquid etherifying agents also include organic liquids which under the working conditions, i.e. at temperatures up to 50° C., do not evaporate, such as sulfones, etc.

Solid etherifying agents may also be added to the stream of alkali cellulose in a state of fluidization in air.

The preliminary mixing step which is to a substantial degree responsible for the achievement of uniform and homogeneous products now follows. During the preliminary mixing step the mixture consisting of alkali cellulose and etherifying agent is agitated while fluidized in the gaseous suspending medium in the form of a loose mass, i.e. without the action of pressure, such that the position of the individual particles of the mixture with respect to each other constantly changes.

The preliminary mixing step can be carried out in various ways. Thus, the stream of gas which comes from the shredder and which is laden with the alkali cellulose and etherifying agent may be moderated so that the alkali cellulose and the etherifying agent separate out of the stream and the alkali cellulose is tranferred into a vessel of any desired structure, in which it is stirred up, for example, into stationary vessels in which kneaders, worm screws or other moving devices keep the mass in motion, or into moving vessels, such as rotary tubes, mixing drums, etc., in which the motion of the vessel, possibly together with moving or stationary agitating elements mounted therein, provides for a continuous change in position of the loosely assembled particles. The apparatus used in the preliminary mixing step may also be transport devices, such as long, semi-cyclindrical troughs in which worm screws are provided to advance the mass, or inclined, rotating tubes through which the loose mixture slowly travels.

The preliminary mixing step may, however, be made still simpler and more rapid by not moderating the air suspended stream of alkali cellulose laden with etherifying agent, but instead introducing it into a whirling section. For this purpose the gas stream is passed through apparatus in which the motion of the gas and the alkali cellulose or particles of etherifying agent is maintained for an additional period of time. Since the particles of alkali cellulose and etherifying agent have small relative speeds with reference to each other, due to their different densities, not only a whirling motion but also a mutual tumbling motion of the alkali cellulose with respect to the etherifying agent takes place in the air suspension. The particles are thereby given an opportunity to touch and adhere to each other, and a very fine and uniform distribution among them takes place. The whirling action can be produced in various types of apparatus. For example, cylindrical or substantially cylindrical chambers are suitable for this purpose into which the stream is introduced tangentially, preferably at the top, so that the material whirls around in spiral fashion. Such a whirling chamber differs from the known cyclone separator, which is used to separate solid substances from streams of gas, in that it does not comprise a gas outlet in the direction of the axis of the cylinder. The stream thereby remains in constant motion and a uniform mixing of both components takes place.

Once a uniform pre-mixing and confluence of the initially separate particles of alkali cellulose and etherifying agent are achieved, the mixture is passed into the mixing mill or shearer. If the preliminary mixing step was carried out in a whirling chamber, the pre-mixed material can be directly aspirated by the mixing mill. The stream of gas may, however, also be first separated from the mixture and the latter may be passed into the mixing mill in the same manner as in those cases where the stream of air laden with alkali cellulose which issues from the shredder is moderated, and the loose mass is then pre-mixed.

The mixing mill may be the same apparatus which was used for shredding the material. For practical purposes it does not need to perform any shredding action, it merely has the task of intensively mixing the material flocculated in the shredder with the etherifying agent. For this reason it is advantageous to use a mixing mill which merely comprises two smooth discs which are in relative motion to each other but do not include teeth. This structure avoids clogging of the mill and caking of material on teeth, grinding discs or grinding segments. Many such mills, however, operate at such high speeds that the centrifugal force developed thereby keeps the moving parts free from deposits. Pug mills and many other types of mills, such as those comprising a rotor revolving within a cylinder, develop such high centrifugal forces, so that teeth, studs or other protruding elements do not produce any breakdowns.

The material issuing from the mill can now be subjected to the reaction. The reaction components are thoroughly admixed with each other in this product so that uniform cellulose ethers are obtained. Since the entire mixing process requires only very little time, the cellulose has little opportunity to react with the air and thus little opportunity to become degraded.

*Example*

An alkali cellulose with 13.3% by weight free alkali was produced by immersing 100 parts by weight air-dried cellulose in a 17% sodium hydroxide solution, and thereafter squeezing off excess sodium hydroxide until the product had a weight of 270 parts by weight. This alkali cellulose in the form of large leaves was first comminuted in a suitable apparatus into small pieces of about 2 to 3 cm. diameter and 0.3 cm. thickness. The comminuted alkali cellulose was then introduced into a shredder at a rate of about 110 kg. per hour in which the toothed grinding discs were in motion relative to each other at a speed of 1400 r.p.m. A strong stream of air was produced by the rotating grinding discs which aspirated the free comminuted alkali cellulose into the mill, and thereafter expelled the same subsequent to shredding in the form of a stream of air laden with alkali cellulose particles. A feed line for the etherifying agent led into the exhaust line from the shredder. With the aid of a dosing worm screw 32 kg. per hour finely powdered solid sodium chloroacetate were introduced by a blower under slight excess pressure into the exhaust line from the shredder. The stream of air thus produced, in which the shredded alkali cellulose and the finely pulverized sodium chloroacetate were fluidized, was now fed into a whirling tower about 2 meters high and 1 meter in diameter. In this whirling tower the material whirled around and after a residence period of about 5 to 20 seconds was introduced at the lower end into a mixing mill. Its passage was facilitated by the suction created by the mixing mill, which was constructed in the same manner as the shredder except that it had smooth grinding discs.

A cyclone separator was attached to the exhaust nozzle of the mixing mill in which a very homogeneous mixture, consisting of shredded alkali cellulose and sodium chloroacetate, was separated from the stream of air. The mixture was then subjected to the reaction in a well known manner, preferably under exclusion of air. The mixture was then allowed to stand for 8 hours in enclosed vessels and was then worked up. A carboxy methyl cellulose with a substitution degree of 0.76 $CH_2COONa$ groups per $C_6H_{10}O_5$ unit was obtained. The product had a fiber content of 0.23%.

While the above described process may be practiced in various ways and in various apparatus, the accompanying drawings illustrate one way of practicing the process without implying that this method is particularly better than any other.

The drawings illustrate a continuous process which involves taking the cellulose from an unwinding roll 1 in the form of a long strand. The alkalizing step, which is not the subject matter of the present process, is merely indicated by arrow 2 in the drawing. The alkalizing step, which may be carried out in any desired manner, produces a continuous ribbon 2a of alkalized cellulose which is fed through roller pair 3 into the rapidly rotating hammer-mill 4. Instead of alkalizing the cellulose in a continuous roll, individual leaves or plates of alkalized and pressed cellulose may be fed through the rolls 3 and into the hammer-mill 4. The rotating hammers 5 break off pieces of the size of about 1 square inch from edge 6 of the continuously advancing ribbon or sheets. These pieces fall through conical shaft 7 and enter at 8 into a shredder 9, in which the alkali cellulose is shredded. Among others, a suitable shredding device is a mill in which a rotating disc, provided with radial ridges or teeth 9a, moves with respect to the stationary housing wall, which is provided with corresponding ridges or teeth. The flow of material through this mill 9 is advantageously accompanied by a stream of air which may be introduced into the mill 9 by a blower (not shown) or may be created by the rotation of the disc of the mill. Mill 9 blows the shredded alkali cellulose into a tubular duct 10 in which the particles of shredded alkali cellulose are suspended in the gas stream. A duct 12 enters duct 10 at point 11, through which aspirated air and the etherifying agent, for example, sodium chloroacetate, are fed into duct 10 with the aid of fan or blower 13 from hopper 14 and screw conveyor 15, the latter being driven by variable speed motor 16. Thus, at point 11 two streams of air are joined, the one passing through duct 10 carries the alkali cellulose fiber suspended therein, whereas the one passing through duct 12 has the etherifying agent finely distributed therein. In order to admix these two streams of air intimately with each other, it has been found to be advantageous not to provide a long tube after point 11, but rather a fluidization chamber 17 into which the gas stream is introduced tangentially and in which the mixture of components remains for an average of 50 seconds. From the chamber 17 the material is passed through cone 18 and is introduced into the mixing mill or shearer 20 at point 19. The mixing mill 20 is advantageously the same construction as that designated by reference numeral 9, except that instead of the friction surfaces with radially arranged ridges or teeth, the device is provided with a smooth rotating ring 20a, which is mounted with respect to an identical ring fixed to the housing such that a small space remains between the two rings. The components thus treated are ideally admixed with each other and it is only necessary to separate the entrained air from the solid material. This is done by introducing the suspension through line 21 into a cyclone separator 22 in which the air leaves through tube 23, whereas the solid material is discharged through cone 24 and the pair of rollers 25.

The solid material discharged from the cone 24 is allowed to stand in enclosed vessels, preferably under exclusion of air, until the desired reaction is completed and is then worked up in the usual manner.

By using a variable speed motor to drive the rolls 3 and to drive the worm screw 15 and adjusting the relative speed of these motors, the quantitative ratio of alkali cellulose and etherifying agent, and thus the degree of substitution of the cellulose ether may be adjusted.

Also by this adjustment, the process of mixing the alkali cellulose and the etherifying agent may be made a continuous one and by virtue of mixing these reagents while suspended in an air or gas stream a more intimate and more rapid mixing may be accomplished.

While we have given an illustrative example and described an illustrative process, it is to be understood that our invention is not limited to the example and process given, and that various modifications and changes may be made from the operations herein described without departing from the scope of the following claims.

We claim:
1. A process for producing cellulose ethers from alkali cellulose and etherifying agents which comprises suspending shredded alkali cellulose particles in a moving gaseous suspending medium, adding the etherifying agent in finely divided form thereto, agitating the alkali cellulose particles and etherifying agent together while suspended in said gas stream and then passing the mixed alkali cellulose and etherifying agent through a mechanical mixer.

2. A process for producing cellulose ethers from alkali cellulose and etherifying agents which comprises establishing a fluidized suspension of alkali cellulose particles in a gaseous suspending medium, adding an etherifying agent in finely divided form to said fluidized suspension, agitating the alkali cellulose particles and etherifying agent together while in said fluidized suspension and then passing the mixed alkali cellulose and etherifying agent through a mechanical mixer.

3. A process for producing cellulose ethers from alkali cellulose and etherifying agents, which comprises producing a stream of a gaseous suspending medium in which shredded alkali cellulose and finely divided etherifying agent are suspended in whirling motion, and the mixture, consisting of shredded alkali cellulose and etherifying agent, which is in the form of a loose mass, is agitated in such a way that the individual particles of the mixture continuously change their position relative to each other, and then comminuting the mixture by subjecting it to shearing forces.

4. The method according to claim 3, in which the alkali cellulose is shredded and the finely divided etherifying agent is added to the gaseous suspending medium having alkali cellulose particles suspended therein which is produced by the shredding.

5. The method according to claim 3, in which the mixture consisting of shredded alkali cellulose and finely divided etherifying agent is maintained in whirling motion for a period of about 5 to 50 seconds.

6. The method according to claim 3, in which the suspended whirling particles of shredded alkali cellulose and finely divided etherifying agent are separated from the gaseous suspending medium, and the mixture which is present in the form of a loosely piled mass is mechanically agitated in such a manner that the individual particles of the mixture continuously change their position relative to each other.

7. The method according to claim 3, in which the admixing of the mass under the influence of shearing forces is carried out between smooth surfaces which are in relative motion with respect to each other.

References Cited in the file of this patent

UNITED STATES PATENTS

| | | |
|---|---|---|
| 1,839,456 | Anderson | Jan. 5, 1932 |
| 2,179,457 | Voss | Nov. 7, 1939 |
| 2,244,195 | Hasselbach | June 3, 1941 |
| 2,654,658 | Marshall | Oct. 6, 1953 |

OTHER REFERENCES

Chemical Engineer's Handbook, 2nd ed. 1941, page 1572.